3,159,618
[3,2-c]-PYRAZOLES OF STEROIDS OF THE ANDROSTANE AND ESTRANE SERIES

Pietro de Ruggieri, Carmelo Gandolfi, and Umberto Guzzi, Milan, Italy, assignors to Ormonoterapia Richter S.p.A., Milan, Italy, a corporation of Italy
No Drawing. Filed May 10, 1963, Ser. No. 279,625
Claims priority, application Italy, May 12, 1962, 23,377/62
22 Claims. (Cl. 260—239.5)

This invention relates to [3,2-c]-pyrazoles of steroids of the androstane and estrane series. The compounds of the invention are represented by the general formula:

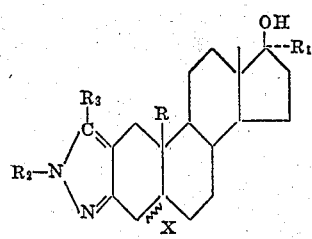

wherein R, $R_1$ and $R_2$ are members selected from the group consisting of hydrogen and methyl, $R_3$ is a member selected from the group consisting of amino-, hydroxy-, chloro-, bromo- and iodo-groups, and X is a single or double bond.

To prepare these compounds, which are endowed with remarkable anabolic activity, 2α-cyano-3-keto-steroids were reacted with hydrazine hydrate and methyl hydrazine to obtain [3,2-c]-5′-amino-pyrazoles and 1′-methyl-5′-amino-pyrazoles. By diazotization of these 5′-amino-pyrazoles and substitution of the resulting diazo-derivative with chlorine, bromine, iodine or a hydroxy group, the required compounds were obtained.

The starting 2α-cyano-3-keto-steroids are obtained by alkali treatment of the corresponding [2,3-d]-isoxazoles (F. A. Zderic et al., Chemistry and Industry, 1960, page 1625, and R. O. Clinton et al., Journal Organic Chemistry, 26, 279, 1961).

The following examples are offered for illustrative purposes, no limitation to the scope of the invention being intended.

EXAMPLE NO. 1

5α-Androstane-17β-Ol-[3,2-c]-5′-Amino-Pyrazole 0.5 part of 98% hydrazine hydrate were added to a solution of 0.3 part of 2α-cyano-5α-androstane-17β-ol-3-one in 6 parts of ethanol. After the mixture was refluxed for 2 hours, it was concentrated and then diluted with water, and the so-obtained product was recrystallized from methanol. Yield: 0.2 part of 5α-androstane-17β-ol- [3,2-c]-5′-amino-pyrazole; M.P. 244–245° C.; $[\alpha]_D = +55°$ (chloroform).

The following compounds were prepared by the same procedure from the corresponding 2α-cyano-ketones:

17α - methyl - 5α - androstane-17β-ol-[3,2-c]-5′-amino-pyrazole: M.P. 170–173° C.; $[\alpha]_D = +31°$ (chloroform); crystallization from methanol.

5α-estrane-17β-ol-[3,2-c]-5′-amino-pyrazole: M.P. >300° C; $[\alpha]_D = +119°$ (chloroform); crystallization from methanol.

Androst - 4 - ene-17β-ol-[3,2-c]-5′-amino-pyrazole: M.P. 248–252° C.; $[\alpha]_D = +115°$ (ethanol); crystallization from methanol.

17α-methyl-androst - 4 - ene - 17β - ol - [3,2-c]-5′-amino-pyrazole: M.P. 250° C., $[\alpha]_D = +94°$ (chloroform); crystallization from methanol.

EXAMPLE NO. 2

5α-Androstane-17β-Ol-[3,2-c]-1′-Methyl-5′-Amino-Pyrazole 0.60 part of methyl hydrazine sulfate and 4 parts of 2 N sodium hydroxide were added to a solution of 0.3 part of 2α-cyano-5α-androstane-17β-ol-3-one in 15 parts of ethanol. The mixture was refluxed for 4 hours, and then diluted with water and the product was recovered by filtration and recrystallized from methanol. Yield: 0.22 part of 5α-androstane-17β-ol-[3,2-c]-1′-methyl-5′-amino-pyrazole; M.P. >300° C.; $[\alpha]_D = +41°$ (pyridine).

The following compounds were prepared by the same procedure from the corresponding 2α-cyano-3-ketones:

17α - methyl - 5α - androstane - 17β-ol-[3,2-c]-1′-methyl-5′-amino-pyrazole: M.P. 257–260° C.; $[\alpha]_D = +33°$ (chloroform); crystallization from methanol.

5α-estrane-17β - ol - [3,2-c]-1′-methyl-5′-amino-pyrazole: M.P. >300° C.; $[\alpha]_D = +95°$ (pyridine); crystallization from methanol.

Androst - 4 - ene - 17β-ol-[3,2-c]-1′-methyl - 5′ - amino-pyrazole: M.P. >270° $[\alpha]_D = +94°$ (pyridine); crystallization from ethyl acetate.

17α - methyl - androst - 4 - ene-17β-ol-[3,2-c]-1′-methyl-5′-amino-pyrazole: M.P. 238–240° C.; $[\alpha]_D = +90°$ (pyridine); crystallization from ethyl acetate-ethyl ether.

EXAMPLE NO. 3

5α-Androstane-17β-Ol-[3,2-c]-5′-Diazo-Pyrazole 14 parts of a 10.4% aqueous sodium nitrite solution were added while stirring, over a period of 1 hour, to a solution of 7.5 parts of 5α-androstane-17β-ol-[3,2-c]-5′-amino-pyrazole in 1000 parts of concentrated hydrochloric acid, such solution being cooled to −15° C. prior to the addition. The temperature was maintained between −10 and −5° C. throughout the reaction and stirring was continued for an additional hour. The solution was then neutralized with a 30% sodium hydroxide solution, keeping the temperature at or below 0° C. The product was collected by filtration and dried under vacuum. Yield: 6.7 parts of 5α-androstane-17β-ol-[3,2-c]-5′-diazo-pyrazole, which decomposed at 138° C.; I.R. 4.62μ (2165 cm.$^{-1}$).

EXAMPLE NO. 4

17α-Methyl-5α-Androstane-17β-Ol-[3,2-c]-5′-Diazo-Pyrazole

Starting from 3.7 parts of 17α-methyl-5α-androstane-17α-ol-[3,2-c]-5′-amino-pyrazole and using the same procedure as in Example 3, 2.95 parts of 17α-methyl-5α-androstane - 17β - ol-[3,2-c]-5′-diazo-pyrazole were obtained; decomposition at about 150° C.; I.R. 4.63μ (2160 cm.$^{-1}$).

EXAMPLE NO. 5

5α-Androstane-17β-Ol-[3,2-c]-Pyrazole-5′-Diazo-chloride

Four parts of 5α-androstane-17β-ol-[3,2-c]-5′-amino-pyrazole were dissolved in 100 parts of a 5 N solution of hydrochloric acid gas in absolute ethanol. While cooling said solution to a temperature ranging from −5 to 0° C., a solution of 1.8 parts of isoamyl nitrite in 10 parts of absolute ethanol was added with stirring over a period of one hour. At the end of two hours, 350 parts of anhydrous ethyl ether were added, to give 4.12 parts of 5α-androstane-17β-ol-[3,2-c]-pyrazole-5′-diazochloride; M.P. 244–247° C.; $[\alpha]_D = +72°$ (methanol); I.R. 4.4μ (2265 cm.$^{-1}$).

EXAMPLE NO. 6

5α-Androstane-17β-Ol-[3,2-c]-5'-Iodo-Pyrazole

Five parts of potassium iodide were added to a solution of 4 parts of 5α-androstane-17β-ol-[3,2-c]-5'-diazo-pyrazole in 200 parts of acetone and 40 parts of water. The mixture was then cooled to 0° C. and 4.5 parts of a 55% solution of hydriodic acid were added with stirring. After the nitrogen formation ceased, the solution was decolorized with a 5% sodium bisulfite solution, neutralized and diluted with water. After drying and recrystallizing from ethyl acetate, 1.2 parts of 5α-androstane-17β-ol-[3,2-c]-5'-iodo-pyrazole were obtained; M.P. 264° C. (with decomposition); $[\alpha]_D = +57°$ (ethanol).

17α-Methyl-5α-Androstane-17β-Ol-[3,2-c]-5'-Iodo-Pyrazole

Starting from 2 parts of 17α-methyl-5α-androstane-17β-ol-[3,2-c]-5'-diazo-pyrazole and using the same procedure just described, 0.32 part of 17α-methyl-5α-androstane-17β-ol-[3,2-c]-5'-iodo-pyrazole were obtained (the product had a M.P. >275° C., and $[\alpha]_D = +72°$ (ethanol)).

EXAMPLE NO. 7

5α-Androstane-17β-Ol-[3,2-c]-5'-Bromo-Pyrazole

One part of potassium bromide and 2 parts of a 48% solution of hydrobromic acid were added to a solution of 0.5 part of 5α-androstane-17β-ol-[3,2-c]-5'-diazo-pyrazole in 30 parts of water and 6 parts of water, on cooling to about 0° C. In the presence of catalytic amounts of cuprous salts, a nitrogen development took place. The mixture was neutralized with ammonia and extracted with ethyl acetate. 0.12 part of 5α-androstrane-17β-ol-[3,2-c]-5'-bromo-pyrazole were recovered from the organic phase: the product had a M.P. 376–378° C., and $[\alpha]_D = +62°$ (pyridine).

EXAMPLE NO. 8

5α-Androstane-17β-Ol-[3,2-c]-1'-Methyl-5'-Chloro-Pyrazole

Four parts of a 5.25% solution of sodium nitrite were added with stirring, over a period of 1 hour, to a solution of 1 part of 5α-androstane-17β-ol-[3,2-c]-1'-methyl-5'-amino-pyrazole in 80 parts of concentrated hydrochloric acid, while cooling to about −10° C. Thereafter, 0.2 part of powdered copper were added and stirring was continued for a further 60 minutes, the temperature being maintained in the range from −8 to −3° C. Sodium hydroxide was then added until neutrality was reached, the solution was extracted with ethyl acetate, and the extract was washed with ammonia and water until neutral; it was then evaporated to dryness and chromatographed on alumina. From the ethyl ether-ethyl acetate (2:8) fractions, 0.21 part of 5α-androstane-17β-ol-[3,2-c]-1'-methyl-5'-chloro-pyrazole were recovered. The product melted at 204–208° C. (after recrystallizing from ethyl ether); $[\alpha]_D = +77°$ (chloroform).

EXAMPLE NO. 9

5α-Androstane-17β-Ol-[3,2-c]-5'-Hydroxy-Pyrazole 2.5 parts of 5α-androstane-17β-ol-[3,2-c]-pyrazole-5'-diazo-chloride were refluxed for 20 hours with 50 parts of water and 6 parts of tetrahydrofuran. Thereafter the mixture was concentrated under vacuum and extracted with ethyl acetate, and the product was chromatographed on acid alumina. Yield: 0.46 part of 5α-androstane-17β-ol-[3,2-c]-5'-hydroxy-pyrazole; M.P. >290° C.; $[\alpha]_D = +53°$ (pyridine).

The following compounds were prepared by the same procedure from the corresponding -[3,2-c]-pyrazole-5'-diazo-chlorides:

17α - methyl - 5α - androstane-17β-ol-[3,2-c]-5'-hydroxy-pyrazole: M.P. 256–261° C.; $[\alpha]_D = +58°$ (ethanol); crystallization from methylene chloride.

5α - androstane - 17β - ol - [3,2-c]-1'-methyl-5'-hydroxy-pyrazole: M.P. 388–392° C.; $[\alpha]_D = +49°$ (benzyl alcohol).

17α - methyl - 5α - androstane-17β-ol-[3,2-c]-1'-methyl-5'-hydroxy-pyrazole: M.P. 378–383° C.; $[\alpha]_D = +52°$ (benzyl alcohol).

What we claim is:
1. A compound of the formula

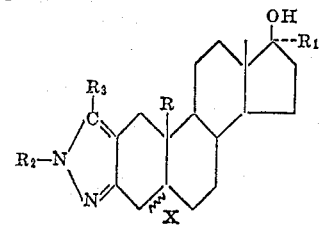

wherein R, $R_1$ and $R_2$ are members selected from the group consisting of hydrogen and methyl, $R_3$ is a member selected from the group consisting of amino, hydroxy, chloro, bromo and iodo, and X is a member selected from the group consisting of a single and a double bond.

2. 5α-androstane-17β-ol-[3,2-c]-5'-amino-pyrazole.
3. 17α-methyl-5α-androstane-17β-ol-[3,2-c]-5'-amino-pyrazole.
4. 5α-estrane-17β-ol-[3,2-c]-5'-amino-pyrazole.
5. Androst-4-ene-17β-ol-[3,2-c]-5'-amino-pyrazole.
6. 17α-methyl-androst-4-ene-17β-ol-[3,2-c]-5'-amino-pyrazole.
7. 5α-androstane-17β-ol-[3,2-c]-1'-methyl-5'-amino-pyrazole.
8. 17α-methyl-5α-androstane-17β-ol-[3,2-c]-1'-methyl-5'-amino-pyrazole.
9. 5α-estrane-17β-ol-[3,2-c]-1'-methyl-5'-amino-pyrazole.
10. Androst-4-ene-17β-ol-[3,2-c]-1'-methyl-5'-amino-pyrazole.
11. 17α-methyl-androst-4-ene-17β-ol-[3,2-c]-1'-methyl-5'-amino-pyrazole.
12. 5α-androstane-17β-ol-[3,2-c]-5'-diazo-pyrazole.
13. 17α-methyl-5α-androstane-17β-ol-[3,2-c]-5'-diazo-pyrazole.
14. 5α-androstane-17β-ol-[3,2-c]-pyrazole-5'-diazo-chloride.
15. 5α-androstane-17β-ol-[3,2-c]-5'-iodo-pyrazole.
16. 17α-methyl-5α-androstane-17β-ol-[3,2-c]-5'-iodo-pyrazole.
17. 5α-androstane-17β-ol-[3,2-c]-5'-bromo-pyrazole.
18. 5α-androstane-17β-ol-[3,2-c]-1'-methyl-5'-chloro-pyrazole.
19. 5α-androstane-17β-ol-[3,2-c]-5'-hydroxy-pyrazole.
20. 17α-methyl-5α-androstane-17β-ol-[3,2-c]-5'-hydroxy-pyrazole.
21. 5α-androstane-17β-ol-[3,2-c]-1'-methyl-5'-hydroxy-pyrazole.
22. 17α-methyl-5α-androstane-17β-ol-[3,2-c]-1'-methyl-5'-hydroxy-pyrazole.

No references cited.

LEWIS GOTTS, *Primary Examiner.*